Patented Mar. 24, 1953

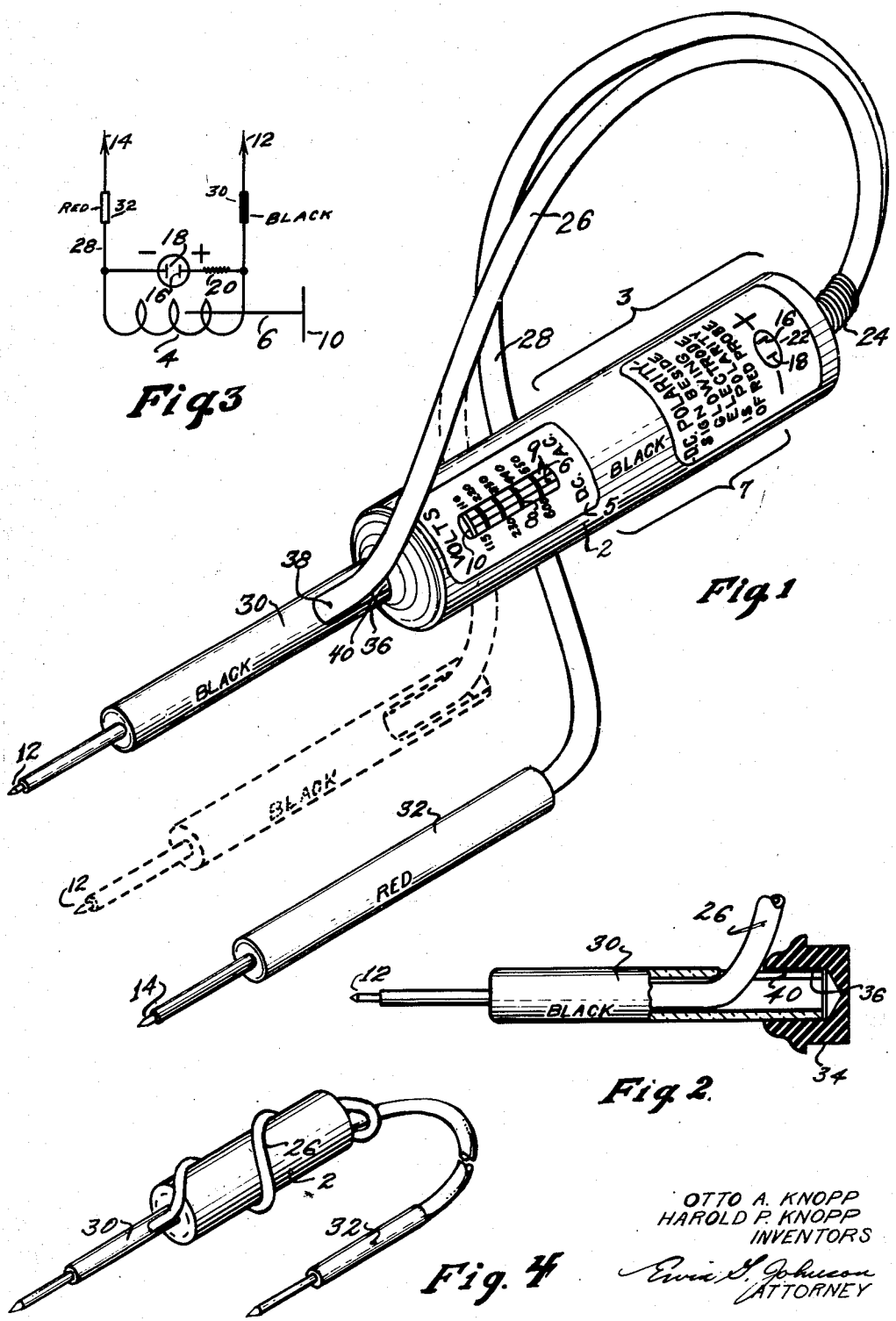

2,632,785

UNITED STATES PATENT OFFICE 2,632,785

POCKET TYPE VOLTAGE AND POLARITY DETECTOR AND INDICATOR

Otto A. Knopp and Harold P. Knopp, Oakland, Calif.; Louise B. Knopp, executrix of Otto A. Knopp, deceased Application April 9, 1945, Serial No. 587,396

20 Claims. (Cl. 171—95)

This invention relates to portable voltage testers such as are commonly used to indicate the presence or absence of voltage on distribution circuits, and to afford an indication of the character of the voltage, if any, on any particular circuit. This type tester, accordingly, enables the user to distinguish between degrees of voltage; as, between 115 and 230 volt taps on the secondary of a transformer, or the wiring associated therewith.

Improvements in the facility with which such testers may be used are among the objects of this invention. The dexterity with which such voltage testers may be used is a factor of some importance inasmuch as such testers are frequently used in relatively inaccessible places, often where the light for seeing the terminals to which the indicator is to be applied is poor, and the space for the entry of the user is restrictive and makes the testing an awkward effort at best.

A common and accepted type voltage tester comprises a pair of test prods, a separate flexible cord for each prod, and an indicating instrument proper. The test prods are electrically connected to the indicator instrument by the flexible cords. The cords conduct energy at the voltage of the circuit tested from the prods to the indicating instrument of the tester, and the indicator gives a sufficiently accurate indication of the voltage of the circuit to show its character or degree. The test prods, cord, and tester instrument are so insulated that the user is able to employ the device without coming in contact with electrically alive parts. The lengths of the rigid parts, that is, the prod assemblies, and the indicating instrument, are such they they can all be placed in the user's pocket, being of the order of from four to seven inches in length. The length of the prod assembly is in general a total of about five inches, which is a minimum for insuring safety in reaching circuit terminals while testing.

One type of indicating means heretofore used in this type tester comprises a reciprocating iron plunger and a solenoid winding for energizing the plunger, the moving indicator being attached to the plunger and traveling along a scale of voltages in accordance with the value of the voltage applied to the solenoid. The solenoid is formed into a tubular shape since this shape is well accommodated to the desirable elongated cylindrical shape of the indicator instrument as a whole, and involves a minimum of departures from standard structural shapes and sizes of components to be employed in the manufacture of the instrument.

Another type of indicating instrument used includes several cathode glow tubes or lamps arranged to glow at different voltages, each lamp having a marking of the voltage value at which it operates identified with it so that the highest value of voltage marking associated with a lighted lamp, is the voltage of the circuit tested. The lamps may be arranged in alignment and serial order of voltage indication to provide, in effect, for a potential scale distribution corresponding to the solenoid type instrument, and the housing for the lamps may be elongated and of a size for carrying in the user's pockets.

The elongated, cylindrical shape of the indicator instruments is conductive, according to this invention, to their employment in a way such that the user sees the instrument indications in the line of sight to the prod, and it is one of the objects of this invention to provide so that the user can see the instrument indications in these types of instruments immediately and in his field of view as he applies the prod to the terminal of a circuit being tested. In this way the user gives full mental and visual attention to acurately placing and holding the prod on the terminal; yet is able, quickly, easily, and accurately to determine the value of the voltage tested while maintaining a firm contact of the prod with the terminal.

To accomplish this object, the prod assembly is rigidly mounted directly on and in elongation of the instrument, and the indicating scale and indicator of the instrument are arrayed along the axis of the instrument body in a position such that the user can see the instrument scale, the prod, and the point to which the prod is applied, simultaneously.

Voltage testers which include an instrument proper, two flexible leads, and two test prod assemblies are often awkward to handle in testing because each hand must hold one prod, and the instrument itself must be placed or held in view, to do which in a satisfactory manner is often impossible. Nevertheless this construction in testers is desirable because the three separate parts can readily be laid together side by side and formed into a package of reasonable size, as by wrapping the cords therearound, or placing in a suitable pouch or pocket provided for the purpose. It is one object of this invention to retain this desirable feature and at the same time in order to provide the feature of rigidly mounting a prod assembly on the indicator, one of the prods and the instrument are provided with arrangements so that they can be fastened together at the will of the user to employ the instrument and one prod together as a single rigid unit manipulatable with one hand.

When so employed, the indicator instrument is held by the same hand of the user as the prod, and the indicator pointer and scale are automatically placed in a position between the point of application of the prod and the user's eye, and clearly readable. This makes it possible for the user to fix the position of the other prod with one hand, as the left in right handed persons, and to use the instrument mounted prod as an exploring prod, and so to determine both the point of application and the voltage condition of each point with but one movement of the eyes. Moreover, the rigid, though temporary, attachment of the prod to the instrument, results in the avoidance of difficulty, found in prior testers of this type, in holding three pieces of a tester in the hands; that is, the two prods on two separate points. Because the safety of the user, as well as that of the instrument and electrical equipment, are dependent upon the degree of skill with which the user is capable of applying the tester in his work, the user of the device here disclosed will ordinarily attach the prod to the instrument.

Because the terminals of an electrical circuit between which the prods of a tester are desired to be applied may be in a position such that the presence of the instrument rigidly attached to one prod would prohibit the application of that one prod to one of the terminals because of the size of the instrument, it is evident that a testing advantage may be secured by providing for detachment of the prod, without, however, interrupting the electrical connection between prod and instrument. Again, freedom of movement of both prods with respect to the instrument permits the application of the two prods to widely separated terminals, where the conductor to one prod is of insufficient length.

This type tester frequently includes a cathode glow lamp by which the user is informed as to the polarity of the direct current voltage systems to which it may be applied, the electrode of the lamp connected to the negative terminal of the source being the one which glows. Accordingly, the electrodes of the lamp are identified by plus and minus characters, and the negative marked electrode indicates, when glowing, the polarity of the prod and electrical terminal of the circuit which are metallically connected to the negatively marked electrode, as being negative. The so connected prod may be of distinct color, as red.

Accordingly, the negatively marked electrode, when it glows, indicates that the polarity of the red prod is negative. Therefore, the marking of the glowing electrode indicates the polarity of the red prod.

Users of voltage testers are not necessarily aware of the fact that the glowing electrode of the lamp used, is, when applied to a direct current source, connected to the negative side of the circuit. It is one of the objects of this invention to provide an accurate indication of the polarity of a certain prod to any person, irrespective of this technical capacity, by simply observing which of two electrodes is glowing and the sign adjacent to it.

In the event of a preference for associating a prod with the instrument at all times, the second prod and the instrument may both be made of the same color, as black, so that the black prod and instrument will, when assembled and applied to direct current circuits, be the prod the polarity of which is indicated by the dark electrode of the glow lamp. Moreover, the sameness of color in instrument and prod, insures that confusion is avoided as to which prod is the one the polarity of which is indicated by the marking of the dark electrode of the glow lamp, irrespective of whether the prod is attached to the instrument or not, and whether or not the instrument is used in darkness.

In lieu of, or in addition to, making the prod of distinct color, its mode of attachment to the instrument should be such that only it can be rigidly attached to the instrument, and that the other prod cannot be rigidly attached to the instrument for making a test. In this way, so long as the prod is rigidly attached to the instrument in such a way that a test may be made, it is certain that the sign of the marking of the dark electrode of the glow lamp indicates the polarity of the terminal contacted by the rigidly attached instrument-carried prod. The special means insuring the attachment of that prod only to the instrument also serves, in addition to or in lieu of color, to identify that prod as the one the polarity of which is indicated by the marking of the dark electrode of the lamp.

Since, in the absence of good lighting, or in the event that a colored prod becomes so discolored that it cannot be distinguished from the other prod by observing its color, the function of prod color is lost, the fact that a certain prod only can be fastened to the instrument, and the fact that that certain prod has a distinct characteristic of shape, are a better insurance that the user will not become confused as to the prod the polarity of which is indicated by the marking of the electrode of the lamp, than mere color identification.

In a voltage tester of this type, the design is preferably such that the entire motive mechanism, including the solenoid, its mounting, the lamp, necessary connections, the restraining spring and the moving plunger, shall be removable from the case in which it is housed, as a unit, so that it may be tested after manufacture and before mounting into the housing (in a suitable production testing jig) and so that it may be easily assembled and disassembled by relatively unskilled persons for repair and reconditioning. To this end the conductors both normally pass through a plug closing one end of the housing which is secured to the chassis of the motive means and securable in the end of the housing. The other end of the housing forms a space within which the indicator moves and in which a window is provided for viewing the indicator. This construction forms the subject matter of a copending application of Otto A. Knopp, Ser. No. 587,395, filed concurrently herewith now Patent No. 2,501,725, issued March 28, 1950. The latter end of the instrument housing is closed by a second plug, and, in order to provide for the attachment to the instrument of one of the prods, this plug is so made that a standard tubing may be employed for the handle of the prod and that the tubing will fit a socket in the plug. Since the conductor normally issues from one end of the prod handle to connect to the instrument, means must be provided so that this cord will not interfere with the reception of the base of the prod handle by the socket of the plug. A side opening slot may be put in either the socket or the prod handle or both to allow the cord to issue sidewise when the handle is received by the socket. It is an object of this invention, in addition to the foregoing, to insure that only one of the prod handles is accommodated by the socket; and, by placing a notch only in one prod handle, only it will be received by the socket.

The objects and advantages above pointed out, and others, will become more apparent from the following specification, considered along with the accompanying drawing, in which like characters denote like parts, and in which:

Figure 1 illustrates, by an isometric view in full lines, the tester as it appears when the instrument is held in the hand in order to apply one of the prods to the circuit to be tested, the other prod being applied by the other hand; and partially in dotted lines illustrates both prods as having freedom of movement with respect to the instrument;

Figure 2 illustrates the preferred manner of attachment of one prod to the instrument;

Figure 3 is a wiring diagram of the tester; and

Figure 4 illustrates one manner of disposition of the conductor with respect to the attached prod and the instrument.

The tester comprises an indicating instrument 2 including an elongated housing of more or less uniform cross section transverse its longitudinal axis. Preferably the housing is cylindrical and formed of tubular insulating material such as black Bakelite. The diameter of the housing is such that it can readily be grasped by one hand without so completely encircling the instrument by the fingers as to obscure either the scale of the instrument or to obscure the polarity indicating lamp and polarity markings when the instrument is provided with such lamp. The length of the instrument is preferably only sufficient to permit grasping one end as in region 3 by the entire hand and yet leave the voltage indicating scale plate 5 fully visible to the user. An outside diameter of the order of one and one-quarter inch, and an overall length of the order of from five to seven inches have been found satisfactory.

Within the housing of 2, in the longitudinal region 7, there is mounted the solenoid 4 (Figure 3). In the longitudinal region of the scale plate 5 there is mounted internally of the housing a reciprocating iron plunger 6, for movement into the solenoid under the magnetic pull of the solenoid when energized, and against the helical spring 8. An indicator 10 is carried by the plunger and is visible in relation to the scales of scale plate 5 through registering window 9 in the housing and the scale plate.

A pair of flexible conductor cords 26 and 28 enter the housing through its end adjacent the region 3, which end is away from the scale plate 5 and its associated indicating parts, and are connected internally to the solenoid, and a neon lamp, if employed, according to the diagram of Figure 3. The cords are insulated, and are protected by suitable wire coils as at 24 in a conventional manner. The cords are, moreover, independent, so that the prods 12 and 14 may be separated in use by a distance equaling as much as the sum of the cord lengths.

To the end of one conductor cord 26 there is mechanically and electrically connected a metal prod 12, and a similar prod 14 is similarly connected to the conductor cord 28. A tubular insulating prod handle 30 of rigid material, is secured to the prod 12 and forms a protective sleeve over the joint made between the prod and the conductor. The handle 30 is preferably made black to match the color of the instrument, so as to more readily identify this handle as being the one which can be attached to the instrument. This prod handle 30 is intended to be readily attachable to the end of the instrument, in a position adjacent the scale plate, and preferably in extension of the longitudinal direction of the instrument. This prod handle 30, is furthermore intended to be readily detachable from the instrument, so that it can be used at a maximum distance from prod 14, as where the points to be contacted are widely separated.

When the prod handle is attached to the end of the instrument as shown by the full line position of Figure 1, both the prod 12 and the instrument are held in one hand by grasping in the region 3; while the other prod, 14, is manipulated by the other hand. Accordingly, with the arrangement of the scale between the region 3 and the prod 12, the user, in viewing the prod 12 incident to placing it on a conductive part of apparatus to be tested, can also readily see the scale. He can also see the polarity indicator when he grasps the instrument so that it is exposed. This is done by holding the instrument in the palm of the hand, with the palm toward the eyes of the user. Thus, by attaching the prod to the instrument at the end adjacent the scale, the scale is visible without interference from the user's hand, even though the user's hand is between the user's eyes and the grasped region 3.

Enabling the user to choose whether the prod shall or shall not be attached to the instrument, permits him to hold both prods and the instrument under complete control in his hands while testing, or, when necessary, to detach the prod 12 from the instrument in order to reach otherwise inaccessible places. With one prod attached to the instrument, he is able to fix that prod in his mind as bearing a definite relation to the indications of the polarity indicating lamp, that is, that "the sign of the dark electrode indicates the sign of the black handled instrument prod."

The preferred method of attaching prod handle 30 to the instrument is illustrated by Figure 2. The end of the instrument housing is closed by a plug 34 provided with a socket 36 of a diameter to produce a tight fit with the external periphery of the handle 30 which is insertable therein. In order to effect the assembly, provision must be made for the cord 26. This may be done by providing a hole through the side of the handle at 38 so as to leave enough of tube 30 to slide into the socket; but preferably the tube is notched clear to the end as at 40 and its resultant compressible shape at the end provides an effective grip of the socket walls, the socket being of less diameter than the tube for the purpose of providing a force fit. Moreover, assembly of the cord to the prod handle is easier.

It will be noted that only prod handle 30 can be inserted into socket 36, while handle 32 cannot be so mounted. This is a substantial advantage since the idea becomes fixed in the mind of the user that the prod 12 has the polarity indicated by the dark electrode of the lamp, because it is impossible for the user to place the wrong prod, 32, on the instrument, and hence impossible for him to be mistaken as to which prod is attached to the instrument, as he might under conditions of poor visibility. Various other ways of providing this effect can, of course, be resorted to.

The prod 14 is provided with a handle 32 which is similar, in structure, to handle 30, but has no provision for passing the cord 28 radially from the inside of the tube. Accordingly, its base end cannot be inserted into socket 36. The sleeve 32 is of a distinct color from that of probe 39, in order to identify it with the legend on the polarity indicating lamp plate. Making the tube 32 of red fiber insures relative permanence in the coloring.

When the tester of this invention is used with the prod attached, the conductor joining this prod to the instrument is neatly looped along the instrument, or can be wound around the instrument to remove all slack from it as illustrated in Figure 4. By winding the conductor into a spiral or coil around the instrument, the conductor cannot so readily interfere with the use of the tester, as by catching on projections and the like. In effect, the tester becomes one having but one electrical conductor with freedom of movement.

It is believed to be clear that the novel features of this invention are applicable to various other types of indicating instruments, and that various ways of accomplishing the results described herein will occur to those skilled in the art.

We claim:

1. In a portable electrical voltage tester having a housing and including an indicating instrument for providing voltage indications, two test prods, flexible independent flexible conductors connecting said prods to the instrument, and means on said instrument and on one of the prods for rigidly securing that prod to the instrument with the prod exposed.

2. In a portable electrical voltage tester, an elongated indicating instrument body provided with a voltage indicating scale having the indications distributed at one side of the instrument in the direction of elongation and provided with means within the body responsive to the voltage of an electrical circuit to cause voltage indications by said indicating scale, two test prods, two flexibly independent flexible conductors connecting said prods to said voltage responsive means, means on said instrument and on one prod for articulatively and rigidly securing said prod to and in extension of said instrument body with the prod exposed for contacting elements of a circuit to be tested, said instrument body being so arranged that it may be grasped and the prod applied to an electrical circuit terminal using the instrument body as a handle and in such a manner that the prod and indications are visible concurrently.

3. In a voltage tester, an elongated indicating instrument, two prods, two flexibly independent flexible electrical conductors joining said prods to the instrument, and means for rigidly and detachably fastening one of said prods to the instrument to form an articulated instrument and prod, said means being in engagement with a portion only of said one prod and leaving the contacting portion of the prod exposed for contacting elements of a circuit to be tested.

4. A voltage tester having an indicating instrument provided with polarity indicating means, two test prods, flexible conductors connecting said prods to the instrument and freely movable with respect to the instrument, and means for rigidly securing one of said prods to the instrument with the prod exposed and so that the instrument may be used as a handle to contact the prod with an electrically charged terminal.

5. A tester as in claim 4, and means secured to the other prod for preventing the securing of the said other prod rigidly to the instrument, whereby the user is enabled to correlate the indication of polarity with the prod attached to the instrument.

6. In a portable combination voltage and polarity indicator of the type having an elongated cylindrical housing containing a solenoid winding and a spring biased armature reciprocating under action of the solenoid and carrying an indicator associated with the two scales respectively marked to indicate values of direct and alternating current voltages and having a visible two electrode cathode glow lamp connected across the terminals of the solenoid winding so that it is known by the user whether to read the direct current scale or the alternating current scale and having a pair of test prods conductively connected to the terminals of the solenoid and the lamp electrodes and having flexible independent conductors joining the test prods to the solenoid windings and lamp and having means for securing one of the prods in fixed relation to the solenoid windings and lamp with the one prod exposed for contacting elements of a circuit to be tester; the combination therein where the lamp electrodes are arranged so that one electrode of the lamp is shown connected to a certain identified one of the two test prods, and the other electrode is shown connected to another of the two test prods; positive and negative polarity markings adjacent the electrodes; and means providing a writing on said housing informing that the polarity of a certain one of the prods on direct current is indicated by a polarity sign adjacent the glowing electrode.

7. In an electrical tester, an indicating device providing a rigid body forming a housing part having therein electrically energized indicating parts for responding to an external source of electrical energy to indicate the presence of such energy thereon, two test prods formed of electrically conductive material and having contact points for contacting electrical terminals of such external sources, a rigid test prod handle part permanently secured to one of said test prods so as to expose the prod point outwardly of one end of the handle part; two flexibly independent flexible electrical conductors permanently electrically joining the respective test prods to the indicating parts of the device, one of said flexible electrical conductors extending through the other end of said prod handle part, and interfitting means on said rigid body and the other end of said prod handle whereby said handle part may be rigidly connected to and separated from said body part at will, one of said parts being slotted through the end of the interfitting means thereon to accommodate the corresponding flexible conductor.

8. In an electrical tester, an indicating device providing a rigid body forming a housing and having therein electrically energized indicating parts for responding to an external source of electrical energy to indicate the presence of energy thereon, two test prods formed of electrically conductive material and having contact points for connecting electrical terminals of such external sources; two flexibly independent flexible electrical conductors permanently electrically joining the respective test prods to the indicating parts of the device and means of connection on said body and one of said prods for rigidly but separably securing the prod to the body with the prod exposed outwardly free of the body at will so that the assembly of said prod and the body may be handled as a unit with one hand of the operator when the connection has been made, the said prod remaining electrically connected to the indicating parts and the other hand of the operator being free to manipulate the other prod; said means of connection further providing for disconnection of said one prod from said body so that it remains flexibly connected thereto and remains electrically connected to the indicating parts.

9. In an electrical tester, an indicating device providing a rigid body forming a housing having therein electrically energized indicating parts for responding to an external source of electrical energy to indicate the presence of such energy thereon; two test prods formed of electrically conductive material and having contact points for contacting electrical terminals of such external sources, a rigid test prod handle of tubular insulating material having one of said prods permanently secured in one end thereof so as to expose the point outwardly of the handle and having a notch formed in the handle wall at the other end thereof; two flexibly independent flexible electrical conductors permanently electrically joining the respective test prods to the indicating parts of the device, one of said conductors extending into the handle to the prod from the notched end thereof, and a socket on said rigid body for receiving the notched end of said handle whereby said handle may be rigidly connected to and separated from the body at will.

10. In an electrical tester, an indicating device providing a rigid body forming a housing and having electrically energized indicating parts therein for responding to an external source of electrical energy to indicate the presence of such energy thereon; two test prods formed of electrically conductive material and having contact points for contacting electrical terminals of such external sources, a rigid elongated test prod handle of insulating material having one of said prods permanently secured to one end thereof so as to expose the point; two flexibly independent flexible electrical conductors permanently electrically joining the respective test prods to the indicating parts, and a socket on said rigid body adapted to snugly fit one end of the handle for receiving said prod handle, whereby said prod handle may be rigidly connected to and separated from said body at will.

11. In an electrical tester, an indicating device providing a rigid body forming a housing and having electrically energized indicating parts therein for responding to an external source of electrical energy to indicate the presence of such energy thereon; two test prods formed of electrically conductive material and having contact points for contacting electrical terminals of such external sources, two rigid test prod handles of tubular insulating material each having one of said prods permanently secured in one end thereof so as to expose the point thereof outwardly of the handle and one only of the said handles having a notch cut out of the handle wall at the other end thereof; two flexibly independent flexible electrical conductors permanently electrically joining the respective test prods to the indicating parts of the device, said conductors extending into the handles and being secured to the prods therewithin, a socket on said rigid body for receiving said one prod handle whereby said handle may be rigidly connected to said body at will with its conductor passing through the notch.

12. In an electrical tester, an indicating device providing a rigid body forming a housing having therein a cathode glow lamp for responding to an external source of electrical energy to indicate the presence of energy thereon, two test prods formed of electrically conductive material and having contact points for contacting electrical terminals of such external sources; means including two flexibly independent continuous flexible electrical conductors permanently conductively joining the respective test prods to the electrodes of the lamp and means of connection on said body and one of said prods whereby said prod may be rigidly connected to said body at will so that the assembly of said prod and body may be handled as a unit with one hand of the operator when the connection is made, the said prod remaining conductively connected to one lamp electrode and the other hand of the operator being free to manipulate the other prod; said means of connection further providing for disconnection of said one prod from said body so that it remains flexibly connected thereto and remains electroconductively connected to the lamp.

13. In an electrical tester, an indicating device providing a rigid body forming a housing having therein a cathode glow lamp for responding to an external source of electrical energy to indicate the presence of such energy thereon; two test prods formed of electrically conductive material and having contact points for contacting electrical terminals of such sources, a rigid test prod handle of tubular insulating material having one of said prods permanently secured in one end thereof so as to expose the point thereof outwardly of the handle and having a notch formed in the handle wall at the other end thereof; means including two flexibly independent continuous flexible electrical conductors permanently conductively joining the respective test prods to the electrodes of the glow lamp, one of said conductors extending into the handle to the prod from the notched end thereof, and a socket on said rigid body for receiving the notched end of said handle whereby said handle may be rigidly connected to and separated from the body at will.

14. In an electrical tester, an indicating device providing a body forming a housing and having a cathode glow lamp therein for responding to an external source of electrical energy to indicate the presence of such energy thereon; two test prods formed of electrically conductive material and having contact points for contacting electrical terminals of such sources, a rigid elongated test prod handle of insulating material having one of said prods permanently secured to one end thereof so as to expose the point; means including two flexibly independent flexible electrical conductors permanently electrically joining the respective test prods to the glow lamp electrodes, and a socket on said rigid body adapted to snugly fit one end of the handle for receiving said prod handle, whereby said prod handle may be rigidly connected to and be separated from said body at will.

15. In an electrical tester, an indicating device providing a rigid body forming a housing and having a cathode glow lamp therein for responding to an external source of electrical energy to indicate the presence of energy thereon; two test prods forming contact points for contacting terminals of such sources, two rigid test prod handles of tubular insulating material each having one of said prods permanently secured in one end thereof so as to expose the point thereof outwardly of the handle and one only of said handles having a notch cut out of the handle wall at the other end thereof; means including two flexibly independent flexible electrical conductors permanently conductively joining the respective test prods to the electrodes of the lamp, said conductors extending into the handles and being secured to the prods therewithin, and a socket on said body for receiving said one prod handle to support the handle in extension of the body.

16. In a direct current polarity indicator, two test prods, means on said prods whereby said prods may be distinguished from each other so that a certain one of said prods may thereby be identified as the prod the polarity of which is indicated by the indicator, a cathode glow lamp having two electrodes, a support for said glow lamp, two flexibly independent flexible electrical conductors electroconductively extending from said prods to the respective electrodes and constituting the mechanical articulations of the prods with the support; means for indicating negative polarity of said certain one of said prods when both prods are connected to an electrical circuit of such voltage that the electrode connected to said certain prod glows comprising a mark connoting negative polarity adjacent said last mentioned electrode; means for indicating positive polarity of said certain prod when both prods are connected to a circuit of such voltage that the other electrode glows comprising a mark connoting positive polarity adjacent said other electrode, means for detachably mounting one of said prods in rigid position on said support, and means preventing the mounting of the other prod on said support.

17. In a direct current polarity indicator, two test prods, means on said prods whereby said prods may be distinguished from each other so that a certain one of said prods may thereby be identified as the prod the polarity of which is indicated, a cathode glow lamp having two electrodes, a support for said glow lamp, two flexibly independent flexible electrical conductors electroconductively extending from said prods to the respective electrodes and constituting the mechanical articulations of the prods with the support; means for indicating negative polarity of said certain one of said prods when both prods are connected to an electrical circuit of such voltage that the electrode connected to said certain prod glows comprising a mark connoting negative polarity adjacent said last mentioned electrode; means for indicating positive polarity of said certain prod when both prods are connected to a circuit of such voltage that the other electrode glows comprising a mark connoting positive polarity adjacent said other electrode, means for detachably mounting one of said prods in rigid position on said support, means preventing the mounting of the other prod on said support, and means on the support indicating that the polarity of the certain prod is that connoted by the mark adjacent the glowing electrode.

18. Electrical apparatus comprising, in combination: a rigid body, electrical mechanism on said body, a plurality of related electrical devices having electrically operative portions, a like plurality of flexibly independent flexible electrical conductors each respectively secured by one of its ends to and extending from a related device and by the other of its ends to and extending from the rigid body, and means independent of the electrical conductor for releasably attaching one of the related devices rigidly to the rigid body with the operative portion exposed for operation.

19. A testing apparatus comprising, in combination: a rigid body, an indicating device on said body, two testing prods having contact portions, two flexibly independent electrical conductors each respectively secured by one of its ends to and extending from a testing prod and secured by the other of its ends to and extending from the rigid body, and means for releasably attaching one of the testing prods rigidly to the rigid body with the contacting portion of the prod free to contact external circuit elements.

20. A testing apparatus comprising, in combination: a rigid body, a polarity indicating device on said body, two testing prods having contacting portions, two flexibly independent flexible electrical conductors each respectively secured by one of its ends to and extending from one of the testing prods and secured by the other of its ends to and extending from the rigid body, and means for releasably attaching only a certain one of the testing prods rigidly to the rigid body with the contacting portion of the prod free to contact external circuit elements.

OTTO A. KNOPP.
HAROLD P. KNOPP.

REFERENCES CITED

The following references are of record in the file of this patent:

UNITED STATES PATENTS

| Number | Name | Date |
| --- | --- | --- |
| 408,018 | Knowles | July 30, 1889 |
| 420,422 | Warner | Jan. 28, 1890 |
| 747,871 | Eldredge | Dec. 22, 1903 |
| 1,193,095 | West | Aug. 1, 1916 |
| 2,075,860 | Mehaffie | Apr. 6, 1937 |
| 2,103,179 | Rennau | Dec. 21, 1937 |
| 2,290,760 | Mehaffie | July 21, 1942 |
| 2,366,991 | Wich | Jan. 9, 1945 |

FOREIGN PATENTS

| Number | Country | Date |
| --- | --- | --- |
| 6,443 of 1899 | Great Britain | Mar. 24, 1899 |
| 367,982 | France | Sept. 21, 1906 |